(12) United States Patent
Ma

(10) Patent No.: US 8,252,881 B2
(45) Date of Patent: Aug. 28, 2012

(54) INITIATOR INTEGRATED POLY(DIMETHYLSILOXANE) AND METHODS FOR MAKING THE SAME AND ITS APPLICATION

(76) Inventor: Xiongming Ma, Beijing (CN)

( * ) Notice: Subject to any disclaimer, the term of this patent is extended or adjusted under 35 U.S.C. 154(b) by 170 days.

(21) Appl. No.: 12/531,484

(22) PCT Filed: Mar. 13, 2008

(86) PCT No.: PCT/CN2008/000494
§ 371 (c)(1),
(2), (4) Date: Feb. 25, 2010

(87) PCT Pub. No.: WO2008/113253
PCT Pub. Date: Sep. 25, 2008

(65) Prior Publication Data
US 2010/0152403 A1    Jun. 17, 2010

(30) Foreign Application Priority Data
Mar. 16, 2007 (CN) .............. 2007 1 064501

(51) Int. Cl.
*C08G 77/12* (2006.01)
(52) U.S. Cl. ............... 528/31; 528/32; 528/25
(58) Field of Classification Search ............ 528/31, 528/32, 25
See application file for complete search history.

(56) References Cited

U.S. PATENT DOCUMENTS

| 4,940,751 | A | 7/1990 | Frances et al. |
| 6,099,852 | A | 8/2000 | Jen |
| 2009/0018276 | A1* | 1/2009 | Boudjouk et al. ............ 525/418 |

FOREIGN PATENT DOCUMENTS

| CN | 1583834 A | 2/2005 |
| CN | 1351629 A | 5/2005 |
| CN | 1712967 A | 12/2005 |
| WO | WO02081183 A1 | 10/2002 |

OTHER PUBLICATIONS

Dozel, et al., *Hydrophilic Poly(dimethylsiloxane) Stamps for Microcontant Printing*, Adv. Mater. (2001) 13, p. 1164.
Rolland, et al., *Solvent-Resistant Photocirable "Liquid Teflon" for Microfluidic Device Fabrication*, J. Am. Chem Soc. (2004) 126, p. 2322.

* cited by examiner

*Primary Examiner* — Kuo-Liang Peng
(74) *Attorney, Agent, or Firm* — Davis Wright Tremaine LLP

(57) ABSTRACT

Disclosed herein is an initiator integrated polydimethylsiloxane (iPDMS). The iPDMS is a polydimethylsiloxane undergoing a hydrosilylation reaction. The initiator 10-undecenyl 2-bromo-2-methyl propionate is integrated on the surface of iPDMS by covalent bond. At % is 0.01-1% confirmed by X-ray photoelectron spectroscopy. Disclosed herein is a method for making an initiator integrated polydimethylsiloxane. Prepolymer A, cross-linker B and vinyl-terminated initiator C were mixed below a ratio of 10:1:4-0.01 for 6-24 hours, then the elastomer was formed. And, disclosed herein is functional surface modification of initiator integrated polydimethylsiloxane and its applications for biocompatibility, organic solvent compatibility and heat-sensitive materials.

1 Claim, 3 Drawing Sheets (A)

(B)

INITIATOR INTEGRATED POLY(DIMETHYLSILOXANE) AND METHODS FOR MAKING THE SAME AND ITS APPLICATION

CROSS-REFERENCE TO RELATED APPLICATIONS

This application is a national stage application of International Application No. PCT/CN2008/000494, filed on Mar. 13, 2008, which claims priority to Chinese Application No. 200710064501.6, filed Mar. 16, 2007.

FIELD

This invention belongs to the field of materials. Disclosed herein is an initiator integrated poly(dimethylsiloxane) and methods for preparing the same. Also disclosed herein is modifying the initiator integrated poly(dimethylsiloxane) and applications of the modified initiator integrated Polydimethylsiloxane for biocompatibility, organic solvent compatibility and heat-sensitive materials.

BACKGROUND

Poly(dimethylsiloxane)(PDMS) is the first choice of material for a wide range of applications like microfluidic system, micro-electromechanical system, soft lithography and unconventional nanolithography, because PDMS has many advantageous properties such as nontoxicity, transparency, flexibility and chemical inertness. Furthermore, PDMS is widely used in many industrial areas such as aviation, electric, medical apparatus. Surface modification of PDMS is needed in order to play the best features of PDMS based devices and further promote the application of PDMS. A number of strategies have been developed for PDMS surface modification, which can be divided into two categories, namely physisorption and chemical coupling.

Physisorption of materials to PDMS surface, such as surfactants and polyelectrolytes are driven by hydrophobic force and electrostatic force, respectively. Although this method is simple, the surface film obtained is less stable and affected by the environmental changes such as temperature and pH change. And, the value of the density and thickness for the surface film are low, and limited to 4 $gcm^{-2}$ and the range of 1 to 5 nm, so that it could be only applied to the very complicated environment such as the diluted serum, the pretreated the cell broken solution etc., or be used in the condition of relative stable environment and low shear force.

Chemical coupling can radically overcome the defect that the film absorbed by physisorption is unstable and is stable but is difficult to achieve because PDMS is chemically inert, which is ironically one of its merits. Common for this method, published in the literature: Dozel, C.; Geissler, M.; Bernard, A.; Wolf, H.; Michel B.; Hilborn, J.; Delamarche, E. Adv. Mater. 2001, 13, 1164., the first step is to apply high-energy bombardment (i.e., plasma) to PDMS surface, which results in a silicate layer with functional groups on the surface, such as —OH, —COOH, and —$NH_2$. Those functional groups not only render the surface hydrophilicity but also allow further modification via chemical coupling. Chemical coupling has two problems: (1) Plasma treatment is easy but not sustainable; recovery of hydrophobicity of treated PDMS is well documented. High-energy bombardment also has the tendency to damage PDMS. Furthermore, this strategy is only applicable to planar structure because of its limited penetration depth. (2) Concentration gradient in "grafting to" strategy prevents the preparation of thick and dense films.

Traditional physisorption and chemical coupling can not satisfy with the requirement of PDMS. Another method, designing and composing new materials, is advanced by the researchers. New materials have been developed to replace PDMS. For example, a photocurable perfluoropolyether (PEPEs) was synthesized to fabricate microfluidic devices that were organic solvent compatible. This material was published in the literature: J. P. Rolland, R. M. Van Dam, D. A. Schorzman, S. R. Quake, J. M. DeSimone, J. Am. Chem. Soc. 2004, 126, 2322. However, this method needs researchers develop a new material for every application. In a consensus, it is costly to develop a new elastomer for each individual need. Development of Micro-electromechanical system (MEMS) is a main direction of application of PDMS. Improving the biocompatibility of PDMS has been a hotspot. However, the material which meets the main property (mechanical property) and surface property (biocompatibility) to replace PDMS has not been reported up to now. Surface modification is an important factor to impact the application of materials and the performance. It can introduce new surface properties as necessary and retain the excellent performance of the main materials at the same time. And it is a high efficient and low consumed solution.

SUMMARY

Disclosed herein is aimed at overcoming the various defects in the conventional technology of modification of PDMS. Firstly, the present invention provides an initiator integrated poly(dimethylsiloxane). Then a functional groups are modified on the surface of initiator integrated poly(dimethylsiloxane) through the surface-initiated polymerization. The method disclosed herein can be easy to achieve the universal, permanent, diversity and functional surface modification of poly(dimethylsiloxane).

The purpose of the invention is accomplished through the following technical solution:

Disclosed herein is an initiator integrated poly(dimethylsiloxane) (iPDMS). The iPDMS is a poly(dimethylsiloxane) carrying at initiator on its surface, which is resulted from a hydrosilylation reaction, with 10-undecenyl 2-bromo-2-methyl propionate being fixed on the surface of iPDMS through covalent bond. And, atomic concentration (At %) is 0.01-1% confirmed by X-ray photoelectron spectroscopy (XPS).

Disclosed herein is a method of making a polydimethylsiloxane carrying an initiator on its surface including mixing prepolymer A, cross-linker B and vinyl-terminated initiator C below a weight ratio of 10:1:4-0.01 for 6-24 hours and then forming the elastomer, which is said polydimethylsiloxane carrying an initiator on its surface.

The said prepolymer A is poly(dimethyl-methylvinylsiloxane).

The said cross-linker B is vinyl-endcapped poly(dimethylmethylvinylsiloxane) or poly(dimethyl-methylhydrogenosiloxane).

The said vinyl-terminated initiator C is 10-undecenyl 2-bromo-2-methylpropionate.

The functional groups are modified on the surface of iPDMS of the present invention through the surface-initiated polymerization for biocompatibility, organic solvent compatibility and heat-sensitive materials. The film (the thickness of the film>50 nm) can prevent the absorption of the protein in case of earring out SI-ATRP of oligo(ethylene glycol) methyl methacrylate from iPDMS for permanent and functional surface coating. The film can prevent the infiltration of $CH_2Cl_2$ in case of carring out SI-ATRP of 1H,1H,2H,2H-perfluorodecyl methacrylate (FMA) from iPDMS for permanent and functional surface coating. And, the film can quickly change between hydrophobic (>32° C.) and hydrophilic (<32° C.) in case of carring out SI-ATRP of poly(N-isopropylacrylamide) from iPDMS for permanent and functional surface coating.

According to the present invention, a vinyl-terminated initiator C was mixed with prepolymer A and cross-linker B, and absorbed covalently highly cross-linked with three-dimensional networks of PDMS through hydrosilylation reaction as showed in the FIG. 1, resulting in an initiator integrated PDMS. The initiator is distributed on the surface of this initiator integrated PDMS in the atomic concentration of 0.01-1%. And then we carried out SI-ATRP from iPDMS for permanent and functional surface coating. The material is used to prepare three-dimensional materials and apparatus, such as functional surface modification PDMS for microfluidic system, micro-electromechanical system, soft lithography and unconventional nanolithography.

The present invention provides a facile method for permanent and functional surface modification of PDMS based on a commercial material. As compared with physisorption, an initiator was integrated by covalent bond firstly. Then a functional molecule was integrated with initiator by chemical bond. Therefore, the method of the present avoids the unsteadiness of the surface prepared by physisorption. According to the technical solutions of the present invention, the density of the functional surface can be tuned by varying the content of initiator, and the thickness of the functional surface can be tuned by selecting functional molecule.

As compared with chemical coupling, the method herein is very simple. And, the "functional" chemical groups on the surface of PDMS won't vanish even though exposed to the air for a long time. iPDMS is the same as PDMS in applications for replica molding, soft lithography, and micro-electromechanical system. The method used for surface modification via SI-ATRP could be carried out in the assembled microchannel, which enables realizing the complex micro-system for high-performance surface modification.

DESCRIPTION

The PDMS was purchased from Dow Corning. The initiator 10-undecenyl 2-bromo-2-methylpropionate and monomers, oligo(ethylene glycol) methyl methacrylate, and 1H,1H,2H,2H-perfluorodecyl methacrylate were purchased from HZDW (Hangzhou, China).

Example 1

Synthesis of iPDMS Having the Atomic Concentration of 1%

Figure 1:
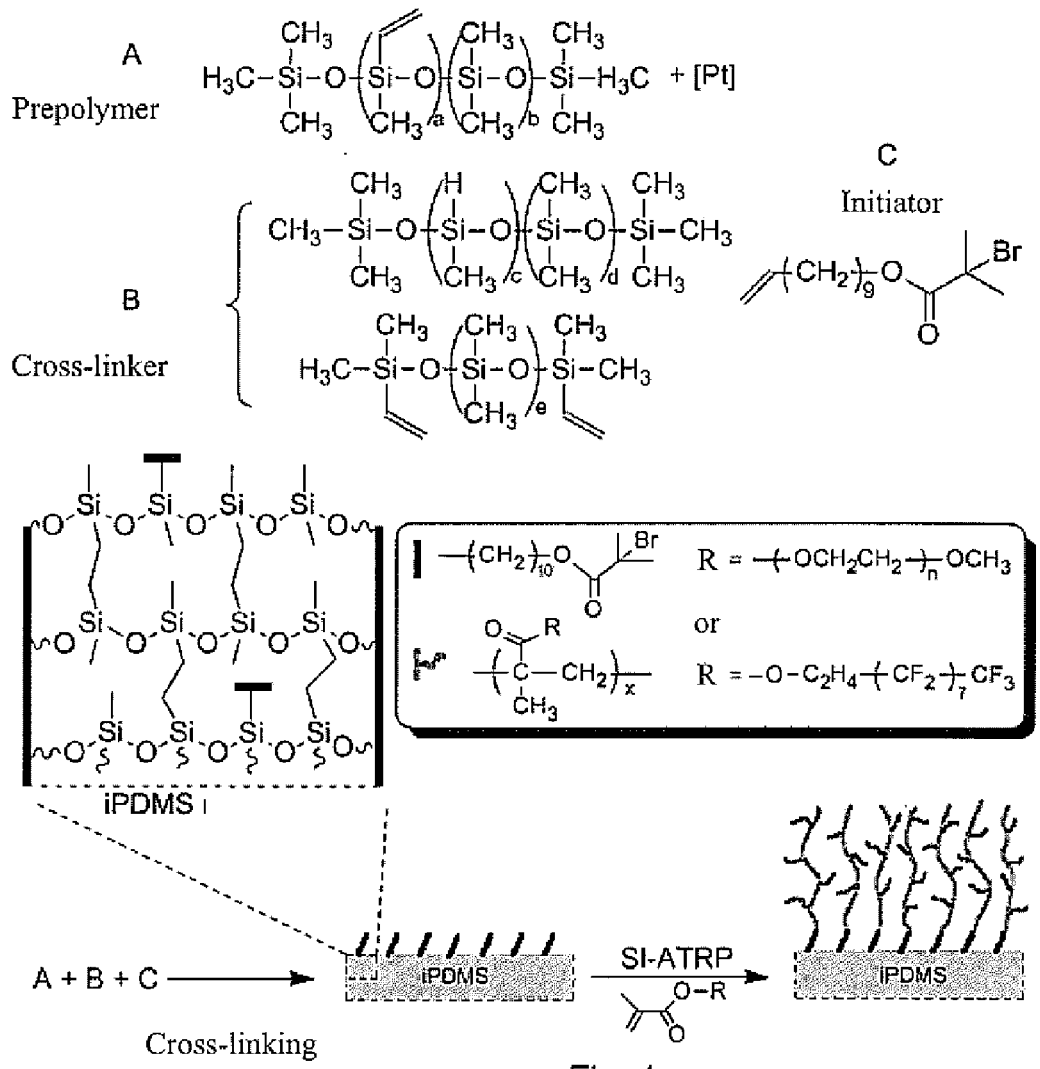
FIG. 1 shows the reaction equation of the preparation of iPDMS.
Figure 2:
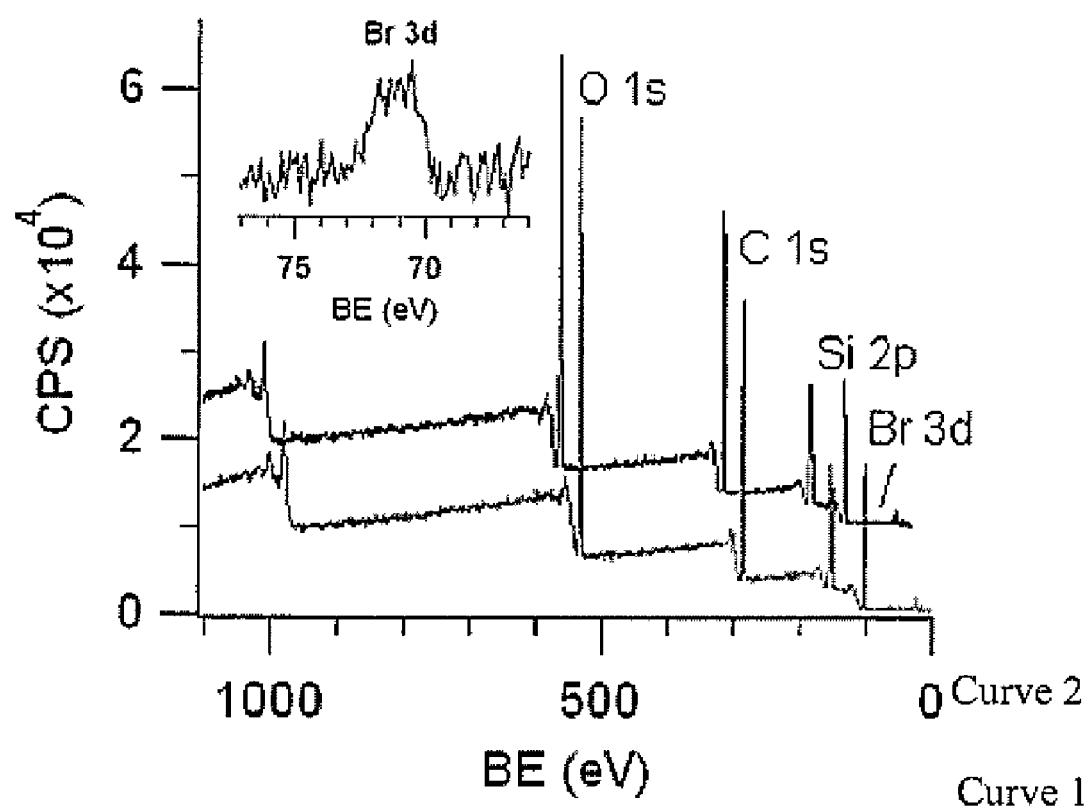
FIG. 2 shows XPS of normal PDMS (the curve 1) and iPDMS prepared in example 1 (the curve 2), wherein inserted was the amplified core scan of Br 3d.

According to the method shown in FIG. 1, prepolymer A (poly(dimethyl-methylvinylsiloxane)), cross-linker B (vinyl-endcapped poly(dimethyl-methylvinylsiloxane)) and vinyl-terminated initiator C (10-undecenyl 2-bromo-2-methylpropionate) were mixed below a ratio of 10:1:4 for 24 hours and then the elastomer which is the initiator integrated poly(dimethylsiloxane) of the present invention was formed. X-ray photoelectron spectroscopy (XPS) was applied to characterize the surface composition of iPDMS. The value of atom % is 1%. Compared with regular PDMS, initiators referred were presented at the surface of PDMS and its amount is enough to initiate the polymer reaction to accomplish the surface modification of PDMS.

Example 2

SI-ATRP of oligo(ethylene glycol) methyl methacrylate from iPDMS Prepared in the Example 1

We carried out SI-ATRP of oligo(ethylene glycol) methyl methacrylate from iPDMS for permanent and functional surface coating. iPDMS was placed in a 100 ml bottle and processed anaerobic treatment. Incomplete reaction mixture (IRM) and complete reaction mixture (CRM) were prepared: IRM was obtained by mixing well with water (5 mL), methanol (10 mL), and the monomer oligo(ethylene glycol) methyl methacrylate (8 mmol, 0.35 M); CRM was obtained by adding the catalyst, CuBr (36 mg, 0.25 mmol) and bipyridine (78 mg, 0.5 mmol), to the IRM, resulting in a dark-red solution. Both IRM and CRM were deoxygenated right before use.

The mixture was transferred into the bottle with iPDMS under inert gas protection. Then reaction was continued for 24 hours at 20° C., followed by taking out iPDMS, rinsing it with methanol and Milli-Q water, drying under the flowing nitrogen, and obtaining the polymer film of oligo(ethylene glycol) methyl methacrylate (the thickness>50 nm). Its XPS was shown as FIG. 3A, in which the characteristic indicated the signal of carbon was enhanced and silicon was weakened. Inserted were the core scans of the characteristic carbon. The information clearly indicated the success of polymerization and oligo(ethylene glycol) methyl methacrylate film deposition on the surface of iPDMS. The film can prevent the absorption of protein, which is prove by observing no fluorescence signal by the fluorescent microscope after immerging the modified iPDMS into Alex488-BSA for 2 hours at 4° C. and rinsing with PBS buffer (Ph=7.4). Alex488-BSA was dissolved in PBS buffer (pH=7.4), and the concentration is 1 mg/ml.

Example 3

SI-ATRP of 1H,1H,2H,2H-perfluorodecyl methacrylate (FMA) from iPDMS Prepared in the Example 1

We carried out SI-ATRP of 1H,1H,2H,2H-perfluorodecyl methacrylate (FMA) from iPDMS for permanent and functional surface coating. iPDMS was placed in a 100 ml bottle and treated anaerobicly. Incomplete reaction mixture (IRM) and complete reaction mixture (CRM) were prepared, wherein IRM was obtained by mixing well with dichloromethane and the monomer 1H,1H,2H,2H-perfluorodecyl methacrylate (FMA) (8 mmol, 0.35 M); and CRM was obtained by adding the catalyst, CuBr (36 mg, 0.25 mmol) and bipyridine (78 mg, 0.5 mmol), to the IRM, resulting in a dark-red solution. Both of IRM and CRM were deoxygenated right before using.

Figure 3:
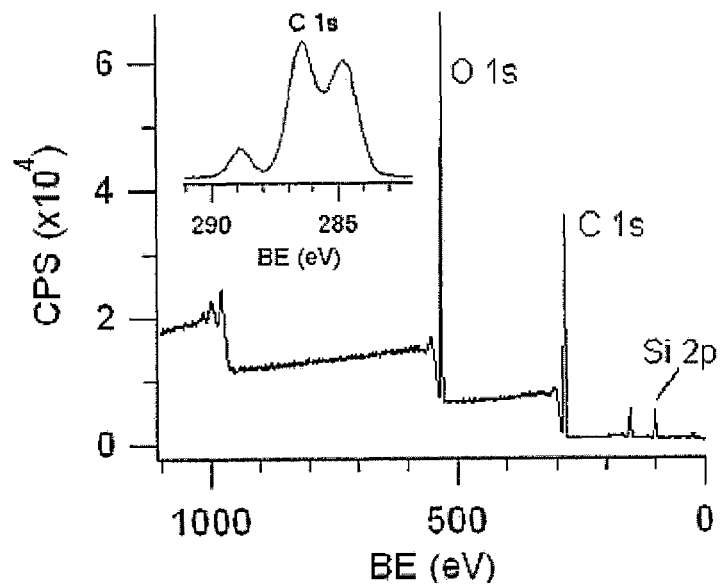
FIG. 3 shows XPS confirmed successful surface modification from iPDMS via SI-ATRP: (A) survey scan of poly (FMA) coating in example 2, and (B) poly-(OEGMA) coating in example 3.
Figure 3:
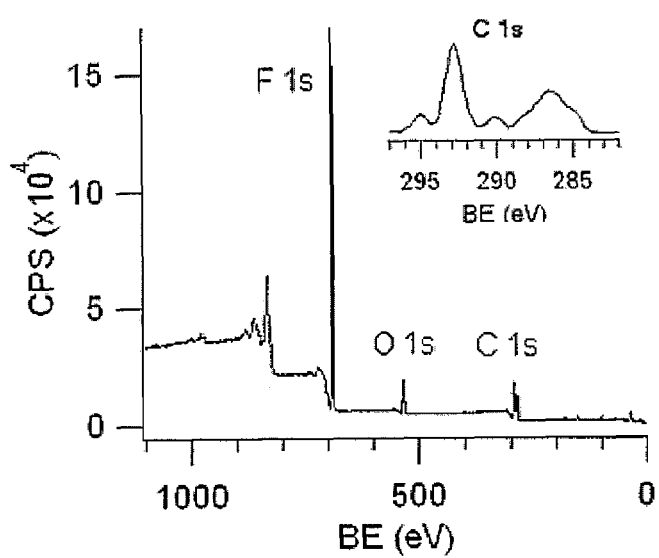

The mixture was transferred into the bottle with iPDMS under inert gas protection. Then reaction was continued for 24 hours at 20° C., followed by taking out iPDMS, rinsing it with methanol and Milli-Q water, and drying under the flowing nitrogen. In FIG. 3B, the characteristic F peak at 699 eV clearly indicated the success of polymerization and film deposition. The film can prevent the infiltration of $CH_2Cl_2$, which is proved by observing the modified iPDMS non-swelling after immerging it into 10 ml dichloromethane for 2 hours at 20° C.

Example 4

SI-ATRP of poly(N-isopropylacrylamide) from iPDMS Prepared in the Example 1

We carried out SI-ATRP of poly(N-isopropylacrylamide) from iPDMS for permanent and functional surface coating. iPDMS was placed in a 100 ml bottle and treated anaerobicly. Incomplete reaction mixture (IRM) and complete reaction mixture (CRM) were prepared, wherein IRM was obtained by mixing well with water (5 mL), methanol (10 mL), and monomer poly(N-isopropylacrylamide) (8 mmol, 0.35 M); and CRM was obtained by adding the catalyst, CuBr (36 mg, 0.25 mmol) and bipyridine (78 mg, 0.5 mmol), to the IRM, resulting in a dark-red solution. Both of IRM and CRM were deoxygenated right before using.

The mixture was transferred into the bottle with iPDMS under inert gas protection. Then reaction was continued for 24 hours at 20° C., followed by taking out iPDMS, rinsing it with methanol and Milli-Q water, and drying under the flowing nitrogen to obtain the film (the thickness>50 nm). The film can quickly change between hydrophobic (>32° C.) and hydrophilic (<32° C.).

The invention claimed is:

1. A polydimethylsiloxane carrying an initiator on its surface, which results from a hydrosilylation reaction, with 10-undecenyl 2-bromo-2-methyl propionate in 0.01-1 At % being fixed on its surface through covalent bond.

* * * * *